3,163,635
WATER-SOLUBLE AZO DYESTUFFS

Henri Riat, Arlesheim, René de Montmollin, Neu-All-schwil, and Eugen Johann Koller, Binningen, Switzerland, assignors to Ciba Corporation, New York, N.Y., a corporation of Delaware
No Drawing. Filed July 28, 1958, Ser. No. 751,147
Claims priority, application Switzerland, Aug. 22, 1957, 49,698/57
7 Claims. (Cl. 260—153)

This invention provides valuable new water-soluble organic azo dyestuffs which contain at least two and at most five acid groups imparting solubility in water, at least one of which is a sulfonic acid group, and a 1:3:5-triazine radical of the formula (1)

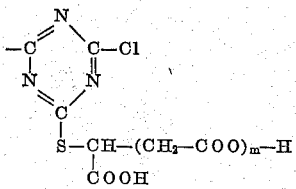

in which $m$ is 0 or 1, and which radical is bound to the dyestuff molecule through an amino-bridge of the formula

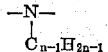

in which $n$ is a positive whole number 1 or 2.

The new dyestuffs may also contain further substituents, especially substituents incapable of imparting solubility in water, such as halogen atoms or cyano, nitro, acylamino, alkyl or alkoxy groups.

The groups imparting solubility in water and the triazine nucleus may be distributed in the dyestuff molecule in any desired manner, that is to say, both of these parts of the molecule may be present in the radial of a single component or one dyestuff component may contain, for example, the groups imparting solubility in water and another dyestuff component may contain the group of the Formula 1. The dyestuffs of this invention may be made from dyestuff components which already contain the aforesaid triazine nucleus. Such dyestuff components can be made by methods in themselves known, for example, by reacting cyanuric chloride, on the one hand, with a dyestuff component containing an acylatable group and, on the other hand, with thioglycolic acid or mercapto-succinic acid (d:l-thiomalic acid) or with a water soluble salt, especially an alkali metal salt thereof.

As dyestuff components suitable for making azo-dyestuffs there may be mentioned those which contain an easily acylatable amino group, for example, a monoalkyl-amino group or a primary amino group; in the case of diazo-components, a nitro group or a less easily acylatable primary amino group; and in the case of coupling components, either a less easily acylatable amino group that influences coupling or a nitro group in the same position, or a hydroxyl group that influences coupling. As less easily acylatable amino groups there may be mentioned primarily acylatable amino groups present in a position vicinal to an acid group, for example, a sulfonic acid group. Amino-hydroxy-compounds are condensed in such manner that condensation at the hydroxyl group is avoided, for which purpose, as is known, a non-alkaline reaction medium is suitable.

Instead of the aforesaid radicals being present in the dyestuff components before the production of the dyestuff, they may be incorporated into the preformed dyestuffs. Thus, for example, by reacting one of the aforesaid aliphatic thiols or an alkali metal salt thereof with cyanuric chloride and a dyestuff containing an acylatable amino group, more especially, a free amino group, valuable dyestuffs can be obtained which contain a radical of the Formula 1.

Soluble organic dyestuffs obtainable in this manner are more especially azo dyestuffs, among them preferably metal-free monoazo and polyazo dyestuffs. Particularly good results are obtained with soluble azo dyestuffs that have no, or at least no pronounced, affinity for cotton.

As examples of dyestuffs containing acylatable amino groups, which may be condensed according to the present process with cyanuric chloride or with primary condensation products from thioglycolic acid or mercapto-succinic acid and cyanuric chloride, may be mentioned the following:

Aminoazo dyestuffs obtainable by hydrolysis of acyl-aminoazo dyestuffs, or by reduction of the nitro group of azo dyestuffs containing nitro groups, or by coupling diazotized aromatic amines with coupling components containing acylatable amino groups such as meta-acyl-amino-aminobenzenes, 1 - aminophenyl - 5 - pyrazolones, aminonaphtholsulfonic acids or the like.

The condensation according to the invention of such dyestuffs or dyestuff components containing an acylatable amino group, with cyanuric chloride and the thioglycolic acid or mercapto-succinic acid is advantageously performed in the presence of an acid acceptor such as sodium acetate or carbonate and under conditions which ensure in the finished product the presence of an exchangeable halogen atom, that is to say, for example, in an oragnic solvent, or at a relatively low temperature in an aqueous medium.

Instead of condensing cyanuric chloride first with the aminoazo dyestuff and then with the thioglycolic acid or mercapto-succinic acid, the procedure may be reversed: By condensing thioglycolic acid or mercapto-succinic acid with cyanuric chloride there is first prepared a dihalogeno-triazine of the formula (3)

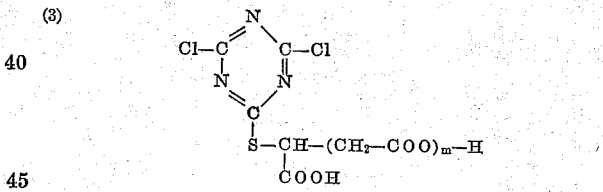

in which $m$ is 0 or 1, the primary condensation product of Formula 3 thus obtained then being further condensed with a dyestuff that contains an acylatable amino group.

In manufacturing the dyestuffs of the invention by condensing a dyestuff that contains an acylatable amino group, for example an aminoazo dyestuff, with cyanuric chloride and one of the specified mercapto compounds, the order of succession of the condensations can as a rule be varied at will.

The dyestuffs of the invention can be isolated and made up into useful, dry dye preparations without having their valuable properties impaired thereby. The isolation according to the invention is preferably carried out at as low a temperature as possible by salting out and filtering. The filtered dyestuffs can be dried, if desired after having been admixed with an extender or a buffer agent, for example with a mixture of mono- and dialkali metal phosphates enabling the pH value being adjusted to 6.5 to about 8, or after having been admixed with sodium nitroarylsulfonate; preferably, however, the drying operation is carried out at not too high a temperature and under diminished pressure. By subjecting the whole mixture in which the dyestuff is made to spray drying, it is in some cases possible to obtain the dry preparations of the invention directly, that is to say without intermediate isolation of the dyestuffs.

The new dyes of the invention are suitable for dyeing by the direct dyeing method with the addition of an alkali, by the so-called pad dyeing method, and for printing a wide variety of materials, more especially fibrous cellulosic materials such as linen, spun rayon, regenerated cellulose and above all cotton. They are especially suitable for dyeing by the so-called pad-dyeing method according to which the material is impregnated with an aqueous, if desired strongly salted, dyestuff solution and the dyestuff is then fixed by an alkali treatment, preferably with heating.

When the dyestuff contains groups capable of forming metal complexes, for example ortho:ortho'-dihydroxyazo groupings or ortho-hydroxycarboxy groupings such as occur in salicylic acid radicals, the dyeing produced with such a dyestuff can be treated with an agent yielding metal, for example an agent yielding chromium or preferably copper. The treatment with the metal-yielding agent can be along usual lines, according to methods as such known. In many cases very valuable dyeings can be obtained by the method according to which the dyeing produced with the metal-free dyestuff is subsequently treated with an aqueous solution that contains a water-soluble (more especially complex) copper compound and a basic formaldehyde condensation product of a compound whose molecule contains at least one atomic grouping of the formula

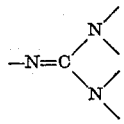

or which, like cyanamide, is easy to convert into such a compound.

To improve the wet fastness properties of dyeings and prints obtained with the new dyestuffs it is advisable to rinse the dyeing or print thoroughly in cold and warm water, if desired with addition of an agent capable of producing a dispersion and of promoting diffusion.

The dyeings obtained with the new dyestuff preparations on cellulosic fibers are as a rule distinguished by the purity of their tints, by good fastness to light and above all by outstanding fastness to washing.

The dyestuffs of the invention are also suitable for dyeing and printing nitrogenous textile materials, such as leather, silk and more especially wool, as well as superpolyamide and superpolyurethane fibers, from a weakly alkaline, neutral or acid bath, for example from an acetic acid bath. Dyeings obtained with such dyestuffs on wool have excellent fastness to washing and fulling. The dyeing of nitrogenous fibers such as wool is advantageously carried out in an acid to neutral bath, if desired with addition of a compound that contains at least one basic nitrogen atom to which is linked at least one radical containing a polyglycol ether chain, the molecule of said compound containing at least 4

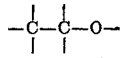

groups (preferably —CH$_2$—CH$_2$—O-groups) and at least 4 carbon atoms not belonging to such a group, for example with addition of a nitrogen compound of the formula

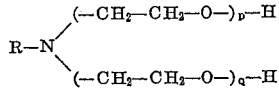

in which R represents a preferably unbranched aliphatic hydrocarbon radical containing at least 12 or preferably 16 to 20 carbon atoms and $p$ and $q$ represent whole numbers, the sum $p+q$ being at least 4 or preferably 6 to 16.

Unless otherwise indicated, parts and percentages in the following examples are by weight.

*Example 1*

24.5 parts of the dyestuff of the formula

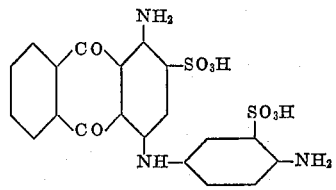

are dissolved in 2000 parts of water with the addition of sodium carbonate solution in a manner such that a neutral solution is obtained which is then added to a suspension of 9.2 parts of cyanuric chloride in ice water. About 50 parts of N-sodium hydroxide solution are then added dropwise so that the reaction mixture reacts as neutral as possible (pH=6.5 to 7.5). When the first condensation is complete, a solution of 4.6 parts of mercaptoacetic acid (HSCH$_2$COOH) in 50 parts of N-sodium hydroxide solution is added and the mixture is stirred at first at 10–20° C. and then at 30–40° C., while at the same time adding about 50 parts of N-sodium hydroxide solution so that the reaction mixture displays a neutral reaction to weakly alkaline (pH=7.0 to 9.0). The dyestuff is then salted out, isolated by filtering the reaction mixture and dried in vacuo. The dark blue powder thus obtained is mixed with 5 parts of anhydrous disodium phosphate and 5 parts of monosodium phosphate. The resulting mixture dissolves in water with blue coloration and dyes cotton by the so-called pad-dyeing method blue tints which are fast to washing.

The second condensation can alternatively be performed by dissolving 4.6 parts of mercaptoacetic acid in 100 parts of N-sodium hydroxide solution and gradually adding this solution dropwise to the solution of the primary condensate.

Instead of the dyestuff isolated by filtration, the mixture of mono- and disodium phosphate can likewise be added to the dyestuff solution after completion of the condensation.

Condensation of the primary condensates in column I with the mercaptans in column II according to the above method yields dyestuffs which dye cotton or wool the tints listed in column III, said tints being fast to washing.

| | I | II | III |
|---|---|---|---|
| 1 | 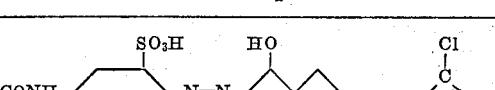 | HSCH$_2$COOH | Scarlet. |
| 2 | 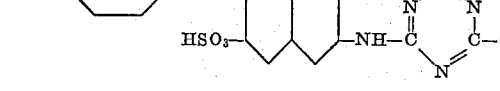 | CH$_2$COOH<br>\|<br>HS—CH—COOH | Do. |

| | I | II | III |
|---|---|---|---|
| 3 | (structure with SO₃H-phenyl-N=N-phenyl(OCH₃)-NH-triazine(Cl,Cl)) | HS—CH₂—COOH | Reddish yellow |
| 4 | (structure: O₂S(OH)-phenyl-N=N-phenyl(SO₃H)-N=N-naphthyl(OH,HO₃S)-NH-triazine(Cl,Cl)) | HS—CH₂—COOH | Red |
| 5 | (structure: O₂S(OH)-phenyl-N=N-phenyl(SO₃H)-N=N-naphthyl(OH,HO₃S)-NH-triazine(Cl,Cl)) | CH₂COOH \| HS—CH—COOH | Do. |
| 6 | (structure: naphthyl(SO₃H,OH,NH₂)-N=N-phenyl(SO₃H)-NH-triazine(Cl,Cl)) | HSCH₂COOH | Bluish red. |
| 7 | (structure: phenyl-N=N-naphthyl(OH,NH₂,HO₃S,SO₃H)-N=N-phenyl-NH-triazine(Cl,Cl)) | HSCH₂COOH | Bluish green |
| 8 | (structure: phenyl(SO₃H)-N=N-naphthyl(OH,HO₃S)-NH-triazine(Cl,Cl)) | HSCH₂COOH | Orange. |
| 9 | (structure: CH₃O-phenyl(SO₃H)-N=N-naphthyl(OH,HO₃S)-NH-triazine(Cl,Cl)) | HSCH₂COOH | Scarlet. |
| 10 | (structure: phenyl(SO₃H)-N=N-naphthyl(OH,HO₃S)-N(CH₃)-triazine(Cl,Cl)) | HSCH₂COOH | Orange. |

Copper complexes of the monoazo dyestuff of the formula

| | | | |
|---|---|---|---|
| 11 | (structure: phenyl(OH)-N=N-naphthyl(OH,HO₃S,SO₃H)-NH-triazine(Cl,Cl)) | HSCH₂COOH | Ruby. |

Example 2

A solution of 18.8 parts of 2:4-diaminobenzene-1-sulfonic acid in 100 parts of water and 50 parts of 2 N-sodium carbonate solution is cooled to 0–5° C. and added to a suspension of 19 parts of cyanuric chloride in 250 parts of ice water. At the same time about 100 parts of N-sodium hydroxide solution are added, to neutralize the reaction mixture. On completion of the condensation there is added dropwise at 20° C. a solution of 9.4 parts of thioglycolic acid in 100 parts of 2 N-sodium hydroxide solution in a manner such that a pH of 7.5 to 8.5 results. The solution thus prepared is diazotized at 0 to 5° C. with 25 parts of concentrated hydrochloric acid and 6.4 parts of sodium nitrite and introduced at 0–5° C. in a fine stream into a well-stirred solution of 42.3 parts of 1-benzoylamino-8-hydroxynaphthalene-3:6-disulfonic acid in 450 parts of water and 40 parts of sodium bicarbonate. On completion of the coupling the dyestuff solution is saturated with sodium chloride and filtered; the dyestuff isolated in this manner is washed with a saturated sodium chloride solution and dried in vacuo at 50 to 60° C. The resulting dyestuff dyes cotton bluish red tints which are fast to washing.

By performing this method with the use of the coupling components listed in column I of the following table similar dyestuffs are obtained which dye cotton or wool the tints in column II, said tints being fast to washing.

|   | I | II |
|---|---|---|
| 1 | 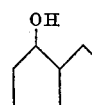 | Orange. |
| 2 | 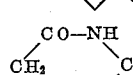 | Greenish yellow. |
| 3 | 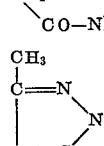 | Do. |
| 4 | 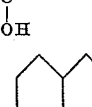 | Orange. |

Example 3

23 parts of 4-acetylamino-1-aminobenzene-2-sulfonic acid are diazotized, and the diazo compound is coupled in a solution rendered alkaline with sodium bicarbonate with 40 parts of the known primary condensate from 1 mol of 2-amino-5-hydroxynaphthalene-7-sulfonic acid and 1 mol of cyanuric chloride. The resulting dichlorotriazine dyestuff is salted out, filtered off and again dissolved in water. A solution neutralized with sodium carbonate of 9.2 parts of thioglycolic acid is added, and the mixture is stirred for 1–2 hours at 20° C. At the same time a sufficiency of dilute sodium carbonate is added dropwise to keep the reaction mixture weakly alkaline (pH=7.5 to 9). On completion of the reaction the monoazo dyestuff formed is salted out and suction-filtered. The filter cake thus obtained can be mixed with a mixture of 5 parts each of disodium phosphate and monosodium phosphate and then dried in vacuo at 50 to 60° C. It dissolves very readily in water and dyes cotton very pure scarlet tints which are fast to washing and light.

When the primary condensation product from 2-amino-5-hydroxynaphthalene-7-sulfonic acid and 1 mol of cyanuric chloride is replaced with the condensation product from 2-methylamino-5-hydroxynaphthalene-7-sulfonic acid, a dyestuff is obtained which dyes cotton slightly more bluish scarlet tints.

The condensation product from 1 mol of 2-methylamino-8-hydroxynaphthalene-6-sulfonic acid and 1 mol of cyanuric chloride produces a red tint.

The 4-acetylamino-1-amino-2-sulfonic acid can be replaced with 4-methoxyaniline-2-sulfonic acid, whereby dyestuffs having very similar properties are obtained.

Finally, when in this example the 2-amino-5-hydroxynaphthalene-7-sulfonic acid is replaced with a corresponding amount of 2-amino-5-hydroxynaphthalene-1:7-disulfonic acid, proceeding as described in this example, a dyestuff is obtained which likewise produces very pure scarlet tints.

Example 4

2 parts of the dyestuff No. 4 in the table in Example 1 are dissolved in 100 parts of water.

The resulting stock solution is added to 2900 parts of water of 20° C. 30 parts of trisodium phosphate and 60 parts of sodium chloride are added, and 100 parts of cotton are immersed in the dyebath. The temperature is raised to 80° C. within 45 minutes, another 60 parts of sodium chloride are added, and dying is continued for 30 minutes at 90 to 95° C. The dying is then rinsed and after-treated for 15 minutes at the boil in a solution containing per liter of water 2 grams of sodium carbonate and 3 grams of soap, again rinsed in cold water and dried.

a red dyeing is obtained which is very fast to washing and light.

What we claim is:

1. An organic water-soluble dyestuff of the formula

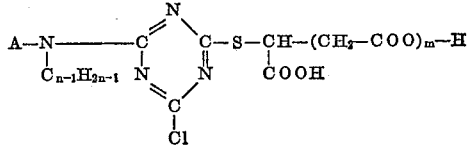

wherein A is an organic azo dyestuff residue, a ring carbon atom of which is directly bonded to the nitrogen atom of the $$-N-\underset{C_{n-1}H_{2n-1}}{|}$$

group, $m$ is one of the numerals 0 and 1, and $n$ is one of the numerals 1 and 2, said dyestuff containing a total of at least two and at most five acid water-solubilizing groups, at least one of which is a sulfonic acid ggroup.

2. A monoazo dyestuff of the formula

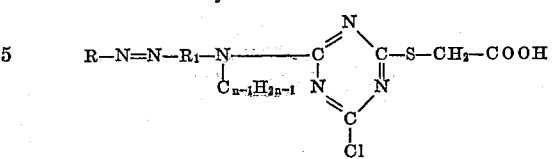

wherein R represents a member selected from the group consisting of a benzene sulfonic acid and a naphthalene sulfonic acid, the sulfonic acid groups being the sole salt forming substituents of R, $n$ represents a whole positive number up to and including 2 and $R_1$ represents a member selected from the group consisting of a benzene radical bound to the azo linkage in p-position relatively to the $$-N-\underset{C_{n-1}H_{2n-1}}{|}$$

substituent and the radical of a hydroxy-napthalene sulfonic acid bound to the azo linkage in vicinal position to hydroxyl group, said dyestuff containing a total of at least two and at most five acid water-solubilizing groups.

3. A monoazo dyestuff of the formula

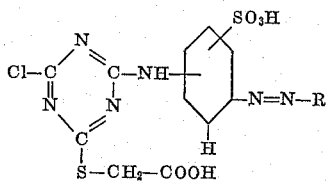

wherein R represents the radical of a coupling component containing a sulfonic acid group and bound to the azo linkage in vicinal position of a member selected from the group consisting of a hydroxyl and an enolized keto group.

4. The monazo dyestuff of the formula

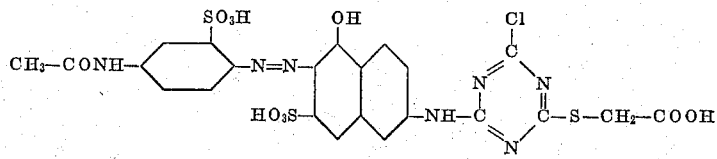

5. The monoazo dyestuff of the formula

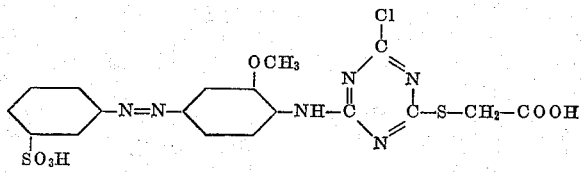

6. The monoazo dyestuff of the formula

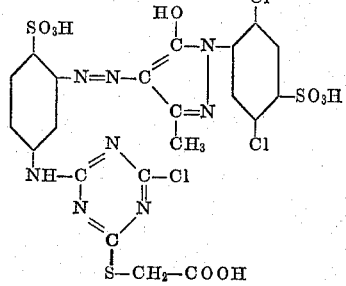

7. The monoazo dyestuff of the formula

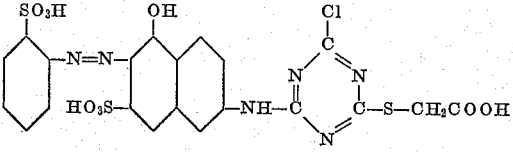

References Cited by the Examiner
UNITED STATES PATENTS
2,795,576   6/57   Fasciati _____ 260—153

CHARLES B. PARKER, *Primary Examiner.*
L. ZITVER, *Examiner.*